United States Patent [19]

Walker et al.

[11] Patent Number: 4,587,297

[45] Date of Patent: May 6, 1986

[54] BLENDS OF POLYOLEFIN-VINYL CHLORIDE GRAFT POLYMERS AND CONDENSATION POLYMERS

[75] Inventors: Leigh E. Walker, Lewiston; Gautam R. Ranade, Grand Island, both of N.Y.

[73] Assignee: Occidental Chemical Corporation, Niagara Falls, N.Y.

[21] Appl. No.: 541,195

[22] Filed: Oct. 12, 1983

[51] Int. Cl.$^4$ ............................................. C08L 67/00
[52] U.S. Cl. ........................................ 525/64; 525/67; 525/68; 525/66; 525/193; 524/504
[58] Field of Search .............................. 525/64, 67, 68

[56] References Cited

U.S. PATENT DOCUMENTS

| | | | |
|---|---|---|---|
| 3,789,083 | 1/1974 | Dumoulin et al. | 260/878 |
| 3,790,644 | 2/1974 | Obsomer | 260/876 |
| 3,852,376 | 12/1974 | Bando et al. | 525/64 |
| 3,956,422 | 5/1976 | Takahashi et al. | 525/64 |
| 4,005,037 | 1/1977 | Mietzsch et al. | 260/4 AR |
| 4,105,711 | 8/1978 | Hardt et al. | 525/67 |
| 4,206,291 | 6/1980 | Takahashi et al. | 525/167 |
| 4,239,861 | 12/1980 | Braese et al. | 525/151 |
| 4,454,300 | 6/1984 | Ranade et al. | 525/71 |

FOREIGN PATENT DOCUMENTS

| | | | |
|---|---|---|---|
| 046650 | 3/1982 | European Pat. Off. | |
| 2304894 | 2/1973 | Fed. Rep. of Germany . | |
| 1561586 | 3/1969 | France . | |
| 56852 | 5/1976 | Japan | 525/64 |
| 56-100844 | 8/1981 | Japan | 525/64 |
| 58-91716 | 5/1983 | Japan . | |
| 832700 | 4/1960 | United Kingdom . | |

*Primary Examiner*—Carman J. Seccuro
*Attorney, Agent, or Firm*—James F. Tao; James F. Mudd

[57] ABSTRACT

A novel thermoplastic polymer composition comprises a blend of polyolefin graft polymer, and a condensation polymer such as a polycarbonate, a polyester of bisphenol and phthalic acids, or a polyalkylene terephthalate.

23 Claims, No Drawings

BLENDS OF POLYOLEFIN-VINYL CHLORIDE GRAFT POLYMERS AND CONDENSATION POLYMERS

BACKGROUND OF THE INVENTION

The present invention relates to thermoplastic polymer blends capable of being molded into plastic articles with improved properties. The polyblends of the present invention contain a graft copolymer of a polymerizable polyolefin component. Such copolymers are hereinafter referred to as "polyolefin graft copolymers". In a preferred embodiment of the invention, the polymerizable monomer is a vinyl halide, such as vinyl chloride, and up to about 50 weight percent of another copolymerizable monomer. The preferred embodiments will be referred to as "vinyl halide-graft polyolefin polymers". The present blends also contain a polymer composition hereinafter referred to as "Condensation Polymers".

Polyvinyl halide, especially polyvinyl chloride, polymer are widely used thermoplastic materials having many favorable properties. Such conventional non-graft vinyl halide polymers do not have heat distortion temperatures which are sufficiently high to adapt such polymers to much more wide use. Moreover, such polymers, especially rigid polyvinyl halide polymers, do not have a high impact resistance at ambient or sub-ambient temperatures. Thus, at ambient temperature, i.e. at about 20° C., corresponding to about 68° F., the notched Izod impact resistance of vinyl haldide homo- and copolymers is only of the order of about 0.4 to less than about 1 ft-lb/in. At sub-ambient temperatures, e.g., down to −20° F. or lower, the notched Izod impact resistance of these polymers becomes vanishingly small or negligible.

It has been previously proposed to add minor amounts of an appropriate polymer additive, or additives, to improve ambient impact resistance of conventional polyvinyl polymer compositions. Usually, such additives are useful in ranges from about 3 to about 15 percent by weight of the polyvinyl halide polymer. Among the materials which have been found acceptable as polyvinyl halide impact modifiers are ABS polymers. Such impact modifiers moderately enhance the ambient temperature impact resistance of conventional vinyl halide polymers, i.e., generally raise the ambient temperature notched Izod impact resistance of the polymer to about 2 to 10 ft-lbs./in. However, these impact modifier are relatively ineffective in imparting a satisfactory sub-ambient temperature impact to the polymer, i.e., the −20° F. notched Izod impact resistance of the polymer containing the impact modifier is well below 1 ft-lb/in and usually is about 0.4 to 0.5 ft-lb/in.

Recently, vinyl halide-polyolefin graft copolymers have been developed to be a commercial reality. Such copolymer are produced by polymerization of vinyl halide (or a monomer mixture of vinyl halide and copolymerizable ethylenically unsaturated comonomers) in the presence of a polyolefin elastomer. Such reaction yields a polymer product which contains vinyl halide polymer chains bound, i.e., grafted at various sites along the chain of the trunk olefin polymer, as well as ungrafted vinyl halide polymer and ungrafted polyolefin. The graft polymer product, especially the graft polymer product prepared by a liquid phase bulk polymerization reaction, has improved impact resistance at both ambient temperature and sub-ambient temperatures compared to the aforementioned conventional, i.e., ungrafted, vinyl halide polymers even when the latter are blended with a conventional polyvinyl halide impact modifying polymer additive. The bulk polymerization-prepared graft polymer product is even distinguished from the corresponding graft polymer prepared by a non-bulk polymerization technique, e.g., suspension polymerization, by an enhanced impact resistance at both low and ambient temperature and by breakage by the desirable ductile breakage mode rather than by an undesirable brittle breakage mode Although such graft polymer possesses a sub-ambient low temperature impact resistance substantially greater than that of conventional impact modifier-containing vinyl halide polymer compositions, the improvement, especially at low temperature in impact resistance is not sufficient enough to make such copolymers generally useful in a wide variety of applications at low temperature.

It is desired to improve the fire retardancy of high performance condensation polymers. It is desirable to add a polymeric fire retarding agent that is compatable to give fire resistance with minimum loss of the good properties of the high performance materials.

It has now been found that blends containing (1) a polyolefin graft polymer prepared in a new way, especially vinyl halide polyolefin graft polymers, and more especially those produced in a mass polymerization reaction, and (2) Condensation Polymers have particularly useful properties.

The molecular miscibility exhibited by the matrix phases of these polymeric components of the invention offers several advantages. The miscibility provides excellent mechanical compatibility. Superior weld line strengths and improved surface properties can be obtained when the polymeric components exhibit molecular miscibility. A problem of possible deterioration of the properties due to phase separation during or after processing may exist for an immiscible blend. This is likely in case of the injection molding process which typically uses very high shear rates. This problem is unlikely in a case where the polymeric components exhibit molecular miscibility.

SUMMARY OF THE INVENTION

The present invention relates to a thermoplastic polymer composition which is comprised of a blend of a polyolefin graft polymer and a Condensation Polymer. The polyolefin graft polymer is a polymer of an ethylenically unsaturated polymerizable monomer and a polymer of an olefin of 2 to about 8 carbon atoms, prepared in a process wherein the olefin polymer is substantially insoluble in the monomer, but is capable of absorbing the monomer.

Another aspect of the invention relates to a thermoplastic polymer composition which is comprised of a blend of a vinyl halide polyolefin graft polymer and a Condensation Polymer. The vinyl halide polyolefin graft polymer is a product of a solid polyolefin particle comprising a polymer of an olefin of 2 to about 8 carbon atoms, preferably a polyolefin of an aliphatic hydrocarbon olefin of 2 to about 8 carbon atoms with a vinyl halide monomer either alone or in combination with up to 50 percent by weight based on the total weight of monomer of an ethylenically unsaturated compound copolymerizable therewith. The olefin polymer is substantially insoluble in the monomer, but is capable of absorbing the aonomer.

Both the polyolefin graft copolymer and the vinyl halide-polyolefin graft polymer are prepared by reacting polyolefins in a proportion of about 20 to about 80 weight percent based on the weight of the reactive monomer, although higher and lower proportions can be used. The preferred proportion is about 30 to about 50 weight percent of polyolefin based on weight of the monomer. The foregoing polyolefin graft polymers are advantageously prepared in a mass polymerization process but can also be prepared in the presence of an inert diluent such as water.

By Condensation Polymer is meant polymers of reactive monomers that propagate with elimination of by-products, such as water, ammonia, methanol and phenol. Typical of such polymers are the various forms of polyesters, such as bisphenol iso- and tere- phthalate polyesters, polyalkylene terephalates; such as polyamides, polycarbonates and the like.

The blends of this invention have beneficial properties when compared to prior art blends.

A further aspect of this invention involves blends of the foregoing polyolefin graft polymers, Condensation Polymers and graft polymers and copolymers of the polymerizable aonomers that can form part of the polyolefin graft polymers. A preferred aspect of this invention involves blends of vinyl halide polyolefin graft polymers, Condensation Polymers and a polymer of a vinyl halide alone or copolymerized with a polymerizable monomer.

DETAILED DESCRIPTION OF THE INVENTION AND THE PREFERRED EMBODIMENTS THEREOF

Proportions of the Condensation Polymer in a binary blend with the polyolefin graft polymer, can range typically from less than about 1 percent to more than about 99 weight percent of Condensation Polymer (with the balance being the graft polymer component). It is preferred to provide blends which contain about 5 percent up to about 80 percent of the polyolefin graft polymer to achieve the desired enhanced properties. Preferred blends of this aspect of the invention contain about from about 5 percent to about 50 percent of the graft polymer component and from about 50 percent to about 95 percent of the Condensation Polymer component said percentages being based on the weight of the blend of the graft polymer and the Condensation Polymer.

With respect to the aspect of the invention involving not only the craft polymer components and the Condensation Polymer component, but also an auxiliary polymer comprising a polymer or copolymer of an ethylenically unsaturated polymerizable monomer, the proportions of components are in the following ranges. The Condensation Polymer component is generally present in a proportion of about 20 percent to about 80 percent of the total polymer components, with the remainder being the polyolefin graft copolymer and the auxiliary polymer component. The latter two components are generally present in the proportion of about 10 parts polyolefin graft polymer to 90 parts auxiliary polymer to about 90 parts polyolefin graft polymer to 10 parts auxiliary polymer. The range is preferably from about 20 parts polyolefin graft polymer to 80 parts auxiliary polymer to 40 parts auxiliary polymer to about 30 parts polyolefin graft polymer to 60 parts auxiliary polymer. All parts and percentages are by weight.

THE POLYOLEFIN GRAFT POLYMER COMPONENT

The component of the polymer blends of the invention is a graft polymer of an ethylenically unsaturated polymerizable monomer and a polymer of an olefin of 2 to about 8 carbon atoms, wherein the olefin polymer is substantially insoluble in the monomer but is capable of absorbing the monomer. Such polymers and the process for making them are described in copending application Ser. No. 541,191, filed on even date herewith, the disclosure of which is incorporated herein by reference.

Monomer Component

The novel graft polymers of the invention are prepared from one or more ethylenically unsaturated compounds that is polymerizable in the presence of a free-radical initiator. Suitable ethylenically unsaturated compounds which can be used are illustrated by the following compounds. Monoolefinic hydrocarbons, i.e., monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear alpha-alkyl or aryl substituted derivatives, e.g., o-, m- or p-methyl, ethyl, propyl or butyl styrene, alpha-methyl, ethyl, propyl or butyl styrene., phenyl styrene, and halogenated styrenes such as alpha-chlorostyrene, mono-olefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl, butyl, octyl and lauryl methacrylate; alkyl crotonates, e.g., octyl; alkyl acrylates, e.g., methyl, ethyl, propyl, butyl, 2-ethyl hexyl, stearyl, hydroxyether and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate vinyl alpha-chloropropionate and vinyl alpha-bromopropionate; allyl and methallyl compounds, e.g., allyl chloride, allyl alcohol, allyl cyanide, allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate and ethyl alpha-chloroacrylate, methyl alpha-bromoacrylate, ethyl alpha-bromoacrylate methyl alpha-fluoroacrylate, ethyl alphafluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate, maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate, and diethyl glutaconate, monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, famaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl 2-ethylhexyl ether, vinyl 2-chloroethyl ether, vinyl cetyl ether and the like., and vinyl sulfides, e.g., vinyl betachloroethyl sulfide, vinyl betaethoxyethyl sulfide and the like can also be included as can diolefinically unsaturated hydrocarbons containing two olefinic groups in conjugated relation and the halogen derivatives thereof, e.g., butadiene-1,3; 2-methyl-butadiene1,3; 2,3-dimethyl-butadiene-1,3; 2-methyl-butadiene-1,3 2,3-dimethyl-butadiene 1,3; 2-chloro-butadiene-1,3, 2-3-dichloro-butadiene-1,3; and 2-bromobutadiene-1,3 and the like. Mixtures of the foregoing compounds can also be employed.

Particularly useful monomer compositions include styrene, methyl methacrylate, methyl acrylate, vinyl acetate, mixtures of styrene and acrylonitrile, and mixtures of styrene and various maleates.

In one aspect of the invention, the preferred monomer composition is comprised totally of a vinyl halide monomer. Suitable vinyl halide monomers useful in the invention are the alpha-halo-substituted ethylenically unsaturated compounds which are capable of entering into an addition polymerization reaction for example vinyl monohalides such as vinyl fluoride, vinyl chloride, vinyl bromide, and vinyl iodide, as well as vinyl dihalides such as vinylidene fluoride, vinylidene chloride, vinylidene bromide, and vinylidene iodide and the like, although vinyl chloride is preferred.

While it is preferred that the monomer composition be comprised totally of vinyl halide monomer as described above, the present invention is also intended to include copolymers formed by the free-radical addition polymerization of a monomer composition containing a predominant amount, e.g., at least 50 percent of vinyl halide with the remainder being another ethylenically unsaturated monomer composition copolymerizable therewith. Preferably, the other ethylenically unsaturated monomer is used in amounts of 20 percent or less by weight and more preferably in amounts of 10 percent or less by weight of the total monomer used in preparing the polymer.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention includes all such combinations.

Polyolefin Component

The polyolefin component of the invention is characterized by being substantially insoluble in the reactive monomer component, and it remains insoluble during the polymerization reaction. The polyolefin is also capable of absorbing the reactive monomer component. When the proportion of polyolefin in the reaction mixture is at least about 20 weight percent of the reactive components, essentially all of the monomer component is absorbed into the particles of polyolefin component where the reaction occurs.

Generally, the polyolefin is capable of absorbing monomer to the extent of at least about 10 weight percent of the weight of polyolefin, usually at least about 25 weight percent and more usually at least about 100 weight percent of the weight of polyolefin. Generally, the polyolefin can absorb monomer up to 10 times the weight of the polyolefin, more usually up to about 400 weight percent and still more usually up to 300 weight percent of the weight of polyolefin. The polyolefin may swell in the presence of the monomer. But the polyolefin remains as a free flowing particle that does not agglomerate or fuse.

The preferred polyolefins are prepared from unsubstituted, aliphatic hydrocarbon monoolefins, including straight chain and branched chain compounds such as ethylene. propylene and butene-1, isobutene, pentene, hexene, heptane, octene, 2-methylpropene-1, 3-methylbutene-1, 4-methylpentene-1, 4-methylhexene-1, and 5-methylhexene-1.

The polyolefin also preferably contains an unsubstituted, aliphatic hydrocarbon polyene, such as diene or triene, as a monomer unit. Generally polyenes of from 5 to 18 carbon atoms are employed.

Suitable comonomers for preparing the polyolefins are those utilized to prepare homopolymers as listed above such as propene or butene-1 with ethene or isobutylene with isoprene and the like. Suitable termonomers are those utilized to prepare homopolymers and copolymers as disclosed above such as propene, ethene and the like containing up to 15 percent, preferably up to about 10 percent by weight of polyene, for example, a diene such as dicyclopentadiene, 1,3-butadiene, 1-5-cyclooctadiene, 2-ethylidene-norbornene-5, 1,4-hexadiene, 1,4-heptadiene, and other conjugated and especially non-cojugated dienes with linear or cyclic chains.

Trienes such as isopropylidene cyclopentadiene and the Diels-Alder mono- and di- adducts thereof with cyclopentadiene can be used in place of the diene.

Unsubstituted, aliphatic diolefins can also be used for preparing useful polyolefins such as butadiene, isoprene, octadiene, and the like. Especially useful are the various forms of polybutadiene, such as made in emulsion, suspension or solution processes, and random, block, and star block polymers with monomers such as styrene.

Various other polyolefins that contain other than hydrogen and carbon can also be employed as long as they meet the criteria of being insoluble in the reactive monomer and capable of absorbing that monomer. Such polyolefins are generally polymers of substituted, aliphatic hydrocarbon olefins of 2 to about 8 carbon atoms and are more particularly polymers of an unsubstituted, aliphatic hydrocarbon olefin of 2 to about 8 carbon atoms and a substituted, aliphatic hydrocarbon olefin of 2 to about 8 carbon atoms. Suitable substituted hydrocarbon olefins include vinyl acetate vinyl benzoate, and other vinyl esters with organic acids and haloacids, isopropenyl acetate and other esters, methyl methacrylate and other alkyl methacrylates, methyl acrylate, ethyl acrylate and other alkyl acrylates, and olefins. Included in such additional polyolefins are olefin-vinyl acetate copolymers, such as ethylene-vinyl acetate copolymers; olefinacrylate copolymers, such as ethylene-acrylate copolymers; polychlorobutadiene, and the like.

Suitable polyolefin components include the above described homopolymers, copolymers or terpolymers, but can also include blends of two or more polyolefins that may not meet the criteria in themselves, but the blended composition is insoluble in the reactive monomer but capable of absorbing the reactive monomer. Thus, certain ethylene propylene diene modified polymers (EPDM) are soluble in vinyl chloride monomer, and hence are not suitable when used alone in the process of the invention. High density polyethylene (HDPE) is insoluble in vinyl chloride monomer, but does not absorb that monomer, and hence is not suitable when used alone in the process of the invention. However, it is found that mixtures of ethylene propylene diene modified polymers and high density polyethylene when melt blended are highly desirable in the process of the invention. The higher the ethylene content of the EPDM, the lower the amount of HDPE required. Particularly suitable are HDPE's having a melt index of 0.1 to 50, blended with a polyolefin, for example, EPDM at a ratio of from 1 to 20 to 20 to 1.

Low density polyethylene is found to be both insoluble in vinyl chloride monomer and capable of absorbing that monomer, and is useful in the process of the invention. The very low density polyethylene waxes, on the other hand, are soluble in vinyl chloride monomer and hence are not suitable when used alone in the process of the invention. Other useful blends of polyolefins include blends of polybutadiene and high density polyethylene. Very high molecular weight polymers, e.g. polybutadiene of weight average molecular weight of over 1,000,000, or ethylene propylene copolymer of weight average molecular weight over 300,000, function in this manner without blending in reactions where their lower homologs may need to be blended to meet the nonsolubility requirement. A given blend or polymer may perform with one monomer where the insolubility requirement is met, but not in another where it dissolves, or partially dissolves. The former would be considered to be within the scope of the invention whereas the latter would not.

The polyolefin used in the invention is in particulate form. The particles may be pellets, such as formed by extrusion through an orifice and cutting into pellets by a dicer. The particles can also be formed as pellets in a pellet forming device. The polyolefin is generally in the form of particles measuring in the range of about 1 to about 5 millimeters, preferably about 1 to about 3 millimeters. Other particle sizes can be used. The particles can be of various shapes, uniform such as beading cylinders, pill shaped, as well as in irregular shapes resulting from grinding.

Reaction Conditions

The polyolefin graft polymer component of the invention is preferably prepared in a mass polymerization process wherein solid discrete particles or pellets of solid polyolefin are mixed with a monomer component in the liquid state and a free-radical initiator compound at ambient temperatures. All or part of the mixture of monomer and initiator compound is absorbed into the solid polyolefin particles.

It is preferred to put all the monomer into the reactor with the polyolefin at the beginning of the reaction. However, the monomer can be added incrementally during the reaction. As indicated hereinbefore, the monomer can be reacted with the polyolefin in steps to achieve the desired product. Generally only sufficient monomer is introduced at one time to the polyolefin to avoid the formation of powdered polymer, except, of course. in the aspect of the invention where co-manufacture of particles of graft polymer and powdered homopolymer or copolymer is desired. When operating in the stepwise embodiment, the amount of monomer added in the second and subsequent steps does not usually exceed the ratio of monomer to polyolefin established in the first step of the sequence.

The reaction mixture is heated to a temperature in the range of about 30 to about 90 degrees Celsius, preferably in the range of about 40 to about 75 degrees Celsius, more preferably in the range of about 60 to about 70 degrees Celsius, and the reaction is allowed to proceed to the desired conversion of monomer, generally in the range of about 30 to 90 percent conversion, preferably about 50 to 80 percent conversion, and more preferably about 60 to 75 percent conversion. Thereafter, the unreacted monomer component is removed from the reaction mixture by suitable degassing techniques such as by direct degassing, by drawing a vacuum on the reaction product, by washing with water or a solvent or by steam distillation. The solid reaction product is withdrawn from the reaction vessel as the product of the process.

Initiators

Suitable initiator compounds for use in the process of the invention include organic or inorganic peroxides, persulfates, ozonides, hydroperoxides, peracids and percarbonates, azo compounds, diazonium salts, diazotates, peroxysulfonates, trialkyl borane-oxygen systems, and amine oxides. Suitable initiators are soluble in the organic phase, such as peroxides: benzoyl peroxide, capryl peroxide, lauroyl peroxide, 2,4-dichlorobenzoyl peroxide, diacetyl peroxide, and acetyl cyclohexylsulfonyl peroxide; azo compounds: azobisiobutyronitrile, azobis(alpha-methylgammacarboxybutyronitrile), azobis(alphagamma-dimethylvaleronitrile), 2,2'-azobis(2,4-dimethylvaleronitrile); peroxydicarbonates: diisopropyl peroxydicarbonate, di-sec-butyl peroxydicarbonate, and dicyclohexylperoxydicarbonate, azobisiobutyramidine hydrochloride, and peresters: t-butyl peroxypivalate and t-butyl peroxyneodecanoate. Peroxydicarbonates, peresters and peroxides are particularly useful in the present invention. The initiator is used in concentration ranging from about 0.01 to about one percent by weight, preferably about 0.1 to about 0.5 percent by weight, based on the total weight of the monomers. Other amounts can be used.

Diluents

Various diluents may be used in the process of the invention as long as they are not reactive with the products of the invention and do not dissolve the products of the invention, which would partially defeat many of the virtues of the process. The most common diluent is water, which may be used without any suspending or emulsifying agent. Essentially, when water is used as the diluent, the particles of solid polyolefin float in the water phase and during the reaction process are dispersed through the water phase by suitable agitation.

Other diluents include organic compounds such as saturated hydrocarbons having from about 3 to about 15 carbon atoms per molecule. Preferably, the diluent is a straight or branched chain, or cyclic saturated hydrocarbon having from 3 to 15 carbon atoms, and more preferably, from 4 to 8 carbon atoms. Alcohols of 1 to 15 carbon atoms can also be employed.

Illustrative examples of suitable diluents which can be employed in the present process include n-propane, n-butane, isobutane, isopentane, neopentane 2-methyl pentane, 3-methyl pentane, 2,2-trimethyl pentane, 2,2,3-trimethyl pentane, n-tridecane and n-pentadecane. Mixtures of these and other hydrocarbon alkanes, as well as cycloalkanes, such as cyclohexane and methyl cyclopropane, can be used also. Useful alcohols include ethyl, isopropyl, butyl, isobutyl, octyl, dodecyl alcohol, ethylene glycol, propylene glycol, 1,3-dihydroxypropane, and the like.

The diluents can enter the polyolefin particle as in the case of hydrocarbons, or may stay out as in the case of water, or may do both.

Chain Transfer Agents

Chain transfer agents can be used in the process of the invention to adjust the molecular weight of the polymer of the unsaturated monomer, such as PVC. The polyolefin component itself is found to serve as a chain transfer agent by changing the molecular weight of the PVC produced in the case of vinyl chloride monomer. Other transfer agents that can be used include aldehydes, mercaptans such as mercaptoethanol, dodecylmercaptan; chloroolefins such as perchloroethylene, trichloroethylene, halomethanes such as bromoform, olefins, substituted isopropyl compounds, thiotin compounds, such as alkyltin mercaptoacetate esters and the like.

THE CONDENSATION POLYMERS

The Condensation Polymers useful in this invention are polymers prepared by polymerization in which the reaction of small molecular to form the polymer molecules is a condensation reaction, producing other small molecules in addition to the polymer molecules. Common types of condensation polymers are polyesters prepared from dicarboxylic acids and glycols, and polyamides prepared from dicarboxylic acids and diamines. The thermoplastic condensation polymers are generally employed.

Suitable polyesters include aromatic polyesters such as the reaction products of a bisphenol and a dicarboxylic compound, such as a mixture of iso and terephthalic acid. Such polyesters are described in detail in U.S. Pat. No. 4,319,007, the disclosure of which is incorporated herein by reference. Polyalkylene terephthalates, such as polyethylene terephthalates and polyethylene terephthalates can be employed.

Very useful in this invention are the polycarbonates which are reaction products of bisphenol and phosgene.

Specific examples of the polyamides are the various forms of nylon.

The Condensation Polymers are described in detail in Encyclopedia of Polymer Science and Technology, H. F. Mark and N. G. Gaylord, Interscience Publishers, 1972, and Handbook of Common Polymers, W. J. Roff and J. R. Scott, CRC Press, 1971, the disclosures of which are incorporated herein by reference.

AUXILIARY POLYMER COMPONENT

In addition to binary blends of the polyolefin graft polymer component and the Condensation Polymer component, highly useful compositions can be proposed by blending in as an auxiliary component, a polymer or copolymer of an ethylenically unsaturated polymerizable compound. Such polymerizable compounds use any of those disclosed hereinabove for preparation of the polyolefin graft polymers.

When the polyolefin graft polymer is a vinyl halide polyolefin graft polymer, it is highly desirable for the auxiliary polymer component to be a vinyl halide homopolymer or copolymer with a copolymerizable ethylenically unsaturated monomer. The vinyl halide monomers and the comonomers are any of those described hereinbefore.

OPTIONAL ADDITIVES

The compositions of the invention can also contain various functional additives which additives are conventional in the preparation of polymer molding compositions. Typically, these additives include thermal and/or light stabilizers as well as external and internal lubricants and processing aids for the polyolefin graft polymer component and the other polymers of the blends of the invention.

Stabilizers suitable for use in making the polymer compositions of the invention include materials known to stabilize the polymer components against the degradation action of heat and/or light. They include known stabilizers, both organic and inorganic, such as metal salts of mineral acids, salts of organic carboxylic acids, e.g. carboxylic acids of 6 to 18 carbon atoms, organo-tin compounds, epoxides, amine compounds and organic phosphites. Conveniently, an organo-tin compound, such as a methyl tin mercaptide, is employed as a stabilizer.

A more detailed description of suitable stabilizers, lubricants and processing aids for incorporation into the compositions of the invention is presented in U.S. Pat. No. 4,319,002, the disclosure of which is incorporated herein by reference.

Additional classes of additives known for use in polymers which can be added optionally to the compositions of the invention in addition to the aforementioned stabilizers, lubricants and processing aids include pigment, dyes and fillers as described in L. R. Brecker, *Plastics Engineering*, March 1976, "Additives 76", pages 3-4, the disclosure of which is incorporated herein by reference.

In general, the amount of each type of the aforementioned optional additive employed in the present composition is about 0.01 to about 5 weight percent, preferably about 0.1 to about 3 weight percent, based on the total resin composition.

When the compositions of the invention contain vinyl halide polymer components, they are essentially of the rigid vinyl halide resin type which contain no more than about 10 weight percent of a plasticizer for vinyl halide grade polymer and preferably are free of said plasticizing additive. Typical suitable plasticizer additives (which are generally organic compounds) conventionally employed in polyvinyl halide compositions include, for example, the esters of aliphatic alcohols of medium chain length, of 7 to about 11 carbon atoms, with phenyl dicarboxylic acids, such as di-n-octyl phthalate and di-iso-nonyl phthalate as well as organic phosphate esters, such as cresyl-diphenylphosphate and octyl diphenyl-phosphate. The chemical structure and technology of plasticizers conventionally employed in polyvinyl halide compositions is more particularly discussed in L. R. Brecker, op. cit. page 5, the disclosure of which is incorporated herein by reference.

PREPARATION OF BLENDS

The compositions of the invention can be prepared by conventional milling and molding techniques. Generally, the component polymers (and, if desired, the above-described optional additives) are added as a particulate solid mixture to a roll mill or a Banbury type mixer and milled at an elevated temperature conventional for processing rigid vinyl halide polymer compositions. The resultant polymer blend obtained as a product from the milling and mixing operation is molded by either an injection or compression molding technique or extruded to produce articles of particular desired shapes at elevated temperature and presssure conditions which are conventional in molding rigid polyvinyl halide compositions. Desirably an injection molding technique is employed to prepare the aforementioned articles which can be in various shapes including bars, plates, rings, rods, as well as sheets and films. Physical or chemical blowing agents can also be added to the moulding compounds according to the invention in order to produce a foam structure under suitable operating conditions.

In addition to the above mentioned other additives, other polymeric materials can be blended with the blend compositions of this invention.

THE EXAMPLES

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

In the following examples, blends were prepared of the following polymer components.

Vinyl Polymer A

In a 5 gallon stainless steel reactor equipped with a helical up dumping agitator, was charged 4 pounds of a commercially pelletized blend of polyolefins containing approximately 85 weight percent of an EPDM elastomer having a molar ratio of ethylene to propylene of about 72 percent to 28 percent, and 3 double bonds of unsaturation as 1,4-hexadiene per 1,000 carbon to carbon bonds (db/1,000 C-C) of approximatly 170,000 weight average molecular weight with about 15 weight percent high density polyethylene. The particle size of the pelletized blend was about 3 mm in diameter by 1.5 mm in thickness. The vessel was pressurized with nitrogen to 180 psig and evacuated. Nine ml of a solution of 0.5 ml of a 75% solution of the t-butyl peroxy neodecanoate in mineral spirits (free radical initiator) and 12 pounds of vinyl chloride containing 5% isobutane were charged and the agitator was operated at 40 rpm and the jacket heated at 60° C. The pressure gradually increased to a maximum of 155 psig, and then fell. The reaction was allowed to proceed for 4 hours and then the unreacted monomer was recovered. Then 18 ml of a butyltin mercaptoacetate ester were added with 3 lb. of VCM. The mixture was heated and stirred for 20 minutes. The unreacted monomer was recovered. The product was degassed under vacuum at 80° C. for 2.5 hours. The yield of white pellets was 11.5 pounds with a calculated polyolefin content of 35%. It was estimated that the product contained at least 21% polyolefin in the grafted form.

Vinyl Polymer B

In a still larger preparation than used in preparing Vinyl Polymer A, 2,000 lbs. of the polyolefin used to make Vinyl Polymer A, were charged to a reactor and heated initially at 60° followed by cooling the jacket to maintain a maximum internal pressure of 150 psig. The reaction was carried out for 2.5 hrs. followed by degassing, etc. The recovered product 6,300 lb. has a calculated polyolefin content of 31.5%. The isolated product was 99+% in the form of free flowing pellets. Only small amounts of powder (0.5%) and agglomerated pellet and scale (0.3%) were observed in the product.

Polycarbonate Polymer

The polycarbonate polymer commercially sold by General Electric Company under the name Lexan 101. Lexan 101 is a high viscosity polycarbonate polymer. This polymer has a number average molecular weight of about 13,000 and a weight average molecular weight of about 35,000. The ratio of the weight average molecular weight to number average molecular weight is 2.53.

Polyarylate Polymer

The polyarylate polymer was prepared by reacting bisphenol-A with diphenyl phthalate monomer in the presence of a catalyst. The intrinsic viscosity of this polymer was approximately 0.4 dl/g.

Polybutylene Terephthalate

The polybutylene terephthalate polymer commercially sold as Valox 310 by General Electric Company.

All polymers used in these examples were dryed before preparing the blends. The blends were prepared on a two-roll Farrell mill heated using a hot oil system. The roll temperatures used for milling were in the range of 350°-380° F. The milling time was kept to a minimum necessary for obtaining good mixing, normally about 4 to 5 minutes.

Due care was taken to obtain a good lateral mixing on the mill. The blend was removed from the mill in the form of a sheet and quickly cut into small pieces. These pieces were coarse ground after cooling. The injection molded tensile and flexural bars were used for evaluating mechanical properties. The injection molding of samples having appropriate ASTM configurations was carried out using an Arburg injection molding machine (Model 221E-150). Table 1 shows the details of the testing procedure used to obtain various properties.

TABLE 1

| | | Summary of Testing and Characterization Methods | | | |
|---|---|---|---|---|---|
| Property/Data | ASTM Method | Instrument Used | Number of Samples | Type of Sample | Comments |
| Tensile Properties Modulus Strength (Yield) Elongation (Yield) | D638 | Instron- Model TTC | 5 | Injection Molded Std dog bone shape Tensile bar. (⅛" × ½"6½") | Strain rate of 0.2"/minute |
| Izod Impact Room Temperature (23.3° C.) or Low Temperature (−28° C.) | D256 | Izod Impact Tester | 3 | Injection Molded Flex Bars (½" × ⅛" × 5") | Three bars tested at both sprue and vent ends. All samples were notched using standard size. |
| Specific Gravity | D792 | Standard | 2 | Injection Molded | Calculated from weight loss of the |

TABLE 1-continued

Summary of Testing and Characterization Methods

| Property/Data | ASTM Method | Instrument Used | Number of Samples | Type of Sample | Comments |
|---|---|---|---|---|---|
| | | Balance | | Bar | sample after immersing in distilled water. |
| Heat Distortion Temperature | D648 | Standard Heat Deflection Bath | 2 | Injection Molded Flex Bar ($\frac{1}{4}$" × $\frac{1}{8}$"/5") | Tested at 264 psi. Sample immersed in silicone. Bath heated at 2° C./min. Sample bar tested edgewise. Two different conditioning methods used for each composition: (a) 48 hours at 50° C. (b) 24 hours at 70° C. |
| Flexural Properties Modulus Strength (Yield) Strain (Yield) | D790 | Instron Model-TMS | 5 | Injection Molded Flexural Bar ($\frac{1}{4}$" × $\frac{1}{8}$" × 5") | Cross head speed of 0.5" per minute |

EXAMPLE 1

Vinyl Polymer B, Polycarbonate Polymer and B-221 injection molding grade PVC resin (Occidental Chemical Corporation) were blended in the ratio indicated in Table 2 using the procedure described above. The properties of this blend composition were tested using the procedures given in Table 1. The results of these tests are given in Table 2.

TABLE 2

| | Vinyl Polymer*:Polycarbonate Polymer (35:65) |
|---|---|
| Mechanical Properties | |
| Tensile Strength | 7.95 × 10³ psi |
| Tensile Modulus | 3.57 × 10⁵ psi |
| Elongation | 5.04% |
| Notched Izod Impact at 23.3° C. | 5.6 ft-lb/in |
| Notched Izod Impact at −28.8° C. | 1.23 ft-lb/in |
| Flexural Strength | 1.4 × 10³ psi |
| Flexural Modulus | 3.76 × 10⁵ psi |
| Percent Strain | 6.35 |
| Rockwell Hardness | R-114 |
| Shore Durometer Hardness | D-81 |
| Specific Gravity | 1.24 |
| Mold Shrinkage | 0.0052 inch/inch |
| Thermal Properties | |
| Heat Distortion Temperature (264 psi) | 98° C. |
| Heat Distortion Temperature (annealed) | 102° C. |
| UL-94 Rating $\frac{1}{8}$" | V-O |
| 1/16" | V-O |
| Brabender Torque Rheometer Data | |
| Fusion Time | 36 sec. |
| Maximum Fusion Torque | 5650 meter-grams |
| Equilibrium Torque | 1350 meter-grams |
| Decomposition Time | 5.1 minutes |

*Weight ratio of PVC to Vinyl Polymer B = 60:40

EXAMPLES 2–6

Vinyl Polymer B was blended with Polycarbonate Polymer in various proportions as indicated in Table 3 using the above described procedure. These blend compositions were tested for heat distortion temperature and notched izod impact strengths using procedures given in Table 1. The results obtained in these tests are shown in Table 3.

TABLE 3

| Example No. | Composition Polycarbonate Polymer:Vinyl Polymer B | Notched Izod Impact Strength at 23.3° C. ft-lb/inch | −28.8° C. ft-lb/inch | Heat Distortion Temperature annealed (264 psi) 48 Hrs. at 50° C. (24 Hrs. at 70° C.) °C. | |
|---|---|---|---|---|---|
| 2 | 100:0 | 17.7 | 4.8 | 127 | (125) |
| 3 | 90:10 | 14.2 | 3.93 | 111 | (115) |
| 4 | 80:20 | 11.8 | 2.8 | 106 | (107) |
| 5 | 70:30 | 8.6 | 2.2 | 100 | (104) |
| 6 | 60:40 | 6.2 | 0.9 | 87 | (95) |

EXAMPLES 7–11

The blends of Vinyl Polymer B, Polycarbonate Polymer and B-221 PVC resin (Occidental Chemical Corporation) were prepared using the foregoing procedures. The proportions of various components are given in Table 4. The properties of these blend compositions were measured using the procedures described in Table 1. The results are given in Table 4.

TABLE 4

| Example No. | Composition Vinyl Polymer*:Polycarbonate Polymer | Notched Izod Impact Strength at 23.3° C. ft-lb/inch | −28.8° C. ft-lb/inch | Heat Distortion Temperature annealed (264 psi) 48 Hrs. at 50° C. (24 Hrs. at 70° C.) °C. | |
|---|---|---|---|---|---|
| 7 | 100:0 | 23.3 | 1.14 | 68 | (68) |
| 8 | 80:20 | 7.7 | 0.71 | 71 | (76) |
| 9 | 60:40 | 3.1 | 1.0 | 74 | (82) |
| 10 | 40:60 | 4.6 | 1.53 | 90 | (97) |

TABLE 4-continued

| Example No. | Composition Vinyl Polymer*:Polycarbonate Polymer | Notched Izod Impact Strength at 23.3° C.    −28.8° C. ft-lb/inch | | Heat Distortion Temperature annealed (264 psi) 48 Hrs. at 50° C. (24 Hrs. at 70° C.) °C. | |
|---|---|---|---|---|---|
| 11 | 20:80 | 14.4 | 2.0 | 106 | (108) |

*Weight ratio of PVC to Vinyl Polymer B = 60:40

EXAMPLES 12–15

Polycarbonate Polymer was blended with B-221 PVC resin (Occidental Chemical Corporation) and Vinyl Polymer B. The proportions of various components used in these blends are indicated in Table 5. 55-gram samples of each blend were dried and tested by Brabender Torque Rheometer. The results are shown in Table 5.

TABLE 5

Brabender Torque Rheometer Data

| | Example No. | | | |
|---|---|---|---|---|
| Polycarbonate Polymer:Vinyl Polymer* | 12 20:80 | 13 40:60 | 14 60:40 | 15 80:20 |
| Ram Pressure (grams) | 7500 | 7500 | 7500 | 7500 |
| R.P.M. | 63 | 63 | 63 | 63 |
| Max Fusion Peak (seconds) | 2.14 | 25.8 | 29.2 | 83.8 |
| Max Fusion Torque (meter-grams) | 4500 | 5300 | 5400 | 5250 |
| Equilibrium Torque (meter-grams) | 900 | 1050 | 1400 | 2100 |
| Decomposition Time (minutes) | 12.2 | 10.3 | 6.3 | 4.4 |
| Stock Held @ (°F.) | 400 | 400 | 400 | 400 |

*Weight Ratio of PVC to Vinyl Polymer B = 60:40

EXAMPLES 16–19

Polycarbonate Polymer was blended with Vinyl Polymer B in different proportions as indicated in Table 5. A 55-gram sample of each blend was dried and tested using a Brabender Torque Rheometer. The results of these tests are given in Table 6.

TABLE 6

Brabender Torque Rheometer Data

| | Example No. | | | |
|---|---|---|---|---|
| Polycarbonate Polymer:Vinyl Polymer B | 16 20:80 | 17 40:60 | 18 60:40 | 19 80:20 |
| Ram Pressure (grams) | 7500 | 7500 | 7500 | 7500 |
| R.P.M. | 63 | 63 | 63 | 63 |
| Max Fusion Peak (seconds) | 66.0 | 53 | 58.4 | 39.6 |
| Max Fusion Torque (meter-grams) | 7100 | 4850 | 4650 | 4200 |
| Equilibrium Torque (meter-grams) | 2400 | 2000 | 1850 | 1650 |
| Decomposition time (minutes) | 5.1 | 4.8 | 6.1 | 7.2 |
| Stock Held @ (°F.) | 400 | 400 | 400 | 400 |

EXAMPLES 20–23

Polyarylate Polymer was blended with Vinyl Polymer B and B-221 PVC resin in different proportions shown in Table 7. The blends were prepared according to previously described procedures. The properties of these blends were measured using procedures described in Table 1. The results are shown in Table 7.

TABLE 7

| Example No. | Composition | Notched Izod Impact Strength at 23.3° C.    −28.8° C. ft-lb/inch | | Heat Distortion Temperature annealed (264 psi) 48 Hrs. at 50° C. (24 Hrs. at 70° C.) °C. | |
|---|---|---|---|---|---|
| | Vinyl Polymer*:Polyarylate Polymer | | | | |
| 20 | 80:20 | 1.3 | 0.4 | 70 | (72) |
| 21 | 60:40 | 0.9 | 0.35 | 73 | (78) |
| 22 | 40:60 | 0.8 | 1.27 | 87 | (89) |
| | Polyarylate Polymer:Vinyl Polymer B | | | | |
| 23 | 60:40 | 3.8 | 0.41 | 98 | (102) |

*Weight ratio of PVC to Vinyl Polymer B = 60:40

EXAMPLES 24–26

The blends of Polyarylate Polymer were prepared with B-221 PVC resin and Vinyl Polymer B. 55-gram samples of these blends were dried and tested using a Brabender Torque Rheometer. The results of these tests are given in Table 8.

TABLE 8

Brabender Torque Rheometer Data

| | Example No. | | |
|---|---|---|---|
| Polyarylate Polymer:Vinyl Polymer* | 24 20:80 | 25 40:60 | 26 60:40 |
| Ram Pressure (grams) | 7500 | 7500 | 7500 |
| R.P.M. | 63 | 63 | 63 |
| Max Fusion Peak (seconds) | 18.8 | 25.0 | 10.0 |
| Max Fusion Torque (meter-grams) | 4040 | 3510 | 3200 |
| Equilibrium Torque (meter-grams) | 930 | 1200 | 1560 |
| Decomposition Time (minutes) | 11.2 | 8.4 | 6.7 |
| Stock Held @ (°F.) | 400 | 400 | 400 |

*Weight Ratio of PVC to Vinyl Polymer B = 60:40

EXAMPLE 27

Vinyl Polymer B was blended with Polyarylate Polymer in a proportion of 60:40 (by weight). A 55-gram sample of this blend composition was dried and tested using a Brabender Torque Rheometer. The results of this test are shown in Table 9.

TABLE 9

Brabender Torque Rheometer Data

| | Example No. 27 |
|---|---|
| Polyarylate Polymer:Vinyl Polymer B | 60:40 |
| Ram Pressure (grams) | 7500 |
| R.P.M. | 63 |
| Max Fusion Peak (seconds) | 63.0 |
| Max Fusion Torque (meter-grams) | 4610 |
| Equilibrium Torque (meter-grams) | 1990 |
| Decomposition Time (minutes) | 5.5 |
| Stock Held @ (°F.) | 400 |

EXAMPLES 28-30

Polybutylene Terephthalate Polymer was blended with Vinyl Polymer B and B-221 PVC resin (Occidental Chemical Corporation) using the above described procedures. The proportions of these components are shown in Table 10. These blend compositions were tested for notched izod impact strength and the heat distortion temperature using procedures described in Table 1. The properties of these blends are shown in Table 10.

TABLE 10

| Example No. | Composition Vinyl Polymer*:Polybutylene Terephthalate | Notched Izod Impact Strength at 23.3° C. ft-lb/inch | −28.8° C. | Heat Distortion Temperature annealed (264 psi) 48 Hrs. at 50° C. (24 Hrs. at 70° C.) °C. | |
| --- | --- | --- | --- | --- | --- |
| 28 | 80:20 | 1.7 | 0.41 | 67 | (63) |
| 29 | 60:40 | 1.5 | 0.53 | 60 | (61) |
| 30 | 0:100 | 1.4 | 0.79 | 55 | (57) |

*Weight ratio of PVC to Vinyl polymer B = 60:40

EXAMPLES 31-32

The Polybutylene Terephthalate Polymer was blended with B-221 PVC resin (Occidental Chemical Corporation) and Vinyl Polymer B using the above described procedure. 55-gram samples of these blends were tested in a brabender Torque Rheometer. The results of these tests are shown in Table 11.

TABLE 11

| Brabender Torque Rheometer Data | | |
| --- | --- | --- |
| | Example No. | |
| | 31 | 32 |
| Polybutylene Terephthalate Polymer:Vinyl Polymer* | 20:80 | 40:60 |
| Ram Pressure (grams) | 7500 | 7500 |
| R.P.M. | 63 | 63 |
| Max Fusion Peak (seconds) | 30.0 | 23.0 |
| Max Fusion Torque (meter-grams) | 3360 | 2960 |
| Equilibrium Torque (meter-grams) | 840 | 990 |
| Decomposition Time (minutes) | 11.7 | 5.6 |
| Stock held at (°F.) | 400 | 400 |

*Weight ratio of PVC to Vinyl Polymer B = 60:40

The foregoing examples illustrate that blends with high impact strengths can be prepared by blending the polyolefin graft polymer with various polycondensation polymers. These blends also possess significantly higher heat distortion temperature and dimensional stability as compared to the heat distortion temperature and dimensional stability of the polyolefin graft polymer. In addition, these blend compositions display excellent notched impact strengths at sub-ambient temperatures. These blends have good flame retardance properties and can be processed at temperatures considerably lower than those necessary for processing the polycondensation polymers.

More specifically. the examples illustrate that the blends of the polycarbonate polymer with polyolefin graft polymer possess excellent impact strengths and high heat distortion temperatures. The blends of the vinyl halide polymer, polycarbonate polymer and the polyolefin graft polymer also display high impact strengths and enhanced heat distortion temperatures. These blends also have improved processability. The blends of the polyolefin graft polymers with the polyarylate polymer and the polybutylene terephthalate polymer display high distortion temperatures along with good notched impact stengths.

I claim:

1. A polymer composition comprising
a thermoplastic condensation polymer and
a vinyl halide polyolefin graft polymer wherein the vinyl halide alone or in combination with up to 50 percent by weight based on the total weight of monomer of an ethylenically unsaturated compound copolymerizable therewith, and in the liquid state, is polymerized with a polyolefin which comprises a polymer of an aliphatic hydrocarbon olefin of 2 to about 8 carbon atoms, and which is in the solid state and is substantially insoluble in the monomer but absorbs a substantial amount of the monomer.

2. The polymer composition of claim 1 wherein the vinyl halide is vinyl chloride.

3. The polymer composition of claim 2 wherein the condensation polymer is a polycarbonate.

4. The polymer composition of claim 2 wherein the condensation polymer is a polyester of bisphenol and a polycarboxylic acid.

5. The polymer composition of claim 2 wherein the condensation polymer is a polyalkylene terephthalate.

6. A polymer composition comprising:
a polycarbonate, and
a vinyl chloride polyolefin graft polymer, where the vinyl chloride in the liquid state, is polymerized with a polyolefin which is in the solid state and comprises an ethylene, propylene diene modified polymer that is substantially insoluble in vinyl chloride but absorbs a substantial amount of vinyl chloride,
wherein the proportion of polyolefin in said graft polymer is greater than about 20 up to about 80 weight percent based on the weight of vinyl chloride.

7. The polymer composition of claim 6 wherein the polyolefin comprises a mixture of an ethylene propylene dient modified polymer and a high density polyethylene.

8. The polymer composition of claim 7 wherein the polyolefin is present in said graft polymer in a proportion of about 30 to 50 percent by weight based on the weight of vinyl chloride.

9. The polymer composition of claim 6 wherein teh vinyl chloride graft polymer is present in a proportion of about 40 to 60 weight percent based on the polymer components.

10. The polymer composition of claim 6 which also comprises polyvinyl chloride.

11. The polymer composition of claim 10 wherein the polycarbonate is present in a proportion of about 20 to about 80 weight percent based on the weight of total polymer components, and the polyolefin graft polymer and polyvinyl chloride are present in a ratio of about 10 parts polyolefin graft polymer to 90 parts polyvinyl chloride to about 90 parts polyolefin graft polymer to 10 parts polyvinyl chloride.

12. A polymer composition comprising:
   a polyester of bisphenol A and a mixture of isophthalic acid and terephthalic acid, and
   a vinyl chloride polyolefin graft polymer, wherein the vinyl chloride in the liquid state, is polymerized with a polyolefin which is in the solid state and comprises an ethylene propylene diene modified polymer that is substantially insoluble in vinyl chloride but absorbs a substantial amount of vinyl chloride,
   wherein the proportion of polyolefin in said graft polymer is greater than about 20 up to about 80 weight percent based on the weight of vinyl chloride.

13. The polymer composition of claim 12 wherein the polyolefin comprises a mixture of an ethylene, propylene diene modified polymer and a high density polyethylene.

14. The polymer composition of claim 13 wherein the polyolefin is present in said graft polymer in a proportion of about 30 to 50 percent by weight based on the weight of vinyl chloride.

15. The polymer composition of claim 12 wherein the vinyl chloride graft polymer is present in a proportion of about 40 to about 60 weight percent based on the weight of the polymer components.

16. The polymer composition of claim 12 which also comprises polyvinyl chloride.

17. The polymer composition of claim 16 wherein the polyester is present in a proportion of about 20 to about 80 weight percent based on the weight of total polymer components, and the polyolefin graft polymer and polyvinyl chloride are present in a ratio of about 10 parts polyolefin graft polymer to 90 parts polyvinyl chloride to about 90 parts polyolefin graft polymer to 10 parts polyvinyl chloride.

18. A polymer composition comprising:
   polybutylene terephthalate, and
   a vinyl chloride polyolefin graft polymer, wherein the vinyl chloride in the liquid state, is polymerized with a polyolefin which is in the solid state and comprises an ethylene propylene diene modified polymer that is substantially insoluble in vinyl chloride but absorbs a substantial amount of vinyl chloride,
   wherein the proportion of polyolefin in said graft polymer is greater than about 20 up to about 80 weight percent based on the weight of vinyl chloride.

19. The polymer composition of claim 18 wherein the polyolefin comprises a mixture of an ethylene, propylene diene modified polymer and a high density polyethylene.

20. The polymer composition of claim 19 wherien the polyolefin is present in said graft polymer in a proportion of about 30 to 50 percent by weight based on the weight of vinyl chloride.

21. The polymer composition of claim 18 wherein the vinyl chloride graft polymer is present in a proportion of about 40 to about 60 weight percent based on the weight of the polymer components.

22. The polymer composition of claim 18 which also comprises polyvinyl chloride.

23. The polymer composition of claim 22 wherein the polybutylene terephthalate is present in a proportion of about 20 to about 80 weight percent based on the weight of total polymer components, and the polyolefin graft polymer and polyvinyl chloride are present in a ratio of about 10 parts polyolefin graft polymer to 90 parts polyvinyl chloride to about 90 parts polyolefin graft polymer to 10 parts polyvinyl chloride.

* * * * *